United States Patent [19]

Yoshida et al.

[11] 4,245,375

[45] Jan. 20, 1981

[54] SHEET-CONNECTING STRUCTURE

[75] Inventors: Hiroshi Yoshida, Uozu; Kiyoo Yoneya, Kurobe, both of Japan

[73] Assignee: Yoshida Kogyo K.K., Tokyo, Japan

[21] Appl. No.: 885,277

[22] Filed: Mar. 10, 1978

[30] Foreign Application Priority Data

Mar. 11, 1977 [JP] Japan ............................ 52-30297[U]

[51] Int. Cl.[3] ............................................ A44B 21/00

[52] U.S. Cl. ..................................... 24/73 R; 66/195; 24/205.16 R

[58] Field of Search .................... 24/205 R, 205.16 R, 24/73 R, 141; 66/195

[56] References Cited

U.S. PATENT DOCUMENTS

| | | | |
|---|---|---|---|
| 1,603,144 | 10/1926 | Nichols | 24/205 R |
| 1,798,471 | 3/1931 | Janke | 24/205 R |
| 4,065,835 | 1/1978 | Yoneya | 24/205 R |

FOREIGN PATENT DOCUMENTS

| | | | |
|---|---|---|---|
| 899597 | 6/1945 | France | 24/141 |

*Primary Examiner*—Kenneth Dorner

*Attorney, Agent, or Firm*—Hill, Van Santen, Steadman, Chiara & Simpson

[57] ABSTRACT

Stringers of a slide fastener are attached to the connecting edges of a sheet for opening and closing thereof and a tightening device is disposed in an intermediate portion of the sheet along the lengthwise direction of the fastener stringers so that the tightening device can tighten and relax the sheet in a direction intersecting said connecting edges at right angles. When the fastener is zipped to open or close the sheet, the tightening device is to be operated beforehand to loosen the sheet. By the provision of this tightening device, the operation of the fastener can be freely functioned as a zipper, and flapping of the sheet can be prevented by the sheet-tightening action of the tightening device.

1 Claim, 10 Drawing Figures

SHEET-CONNECTING STRUCTURE

BACKGROUND OF THE INVENTION

1. Field of the Invention

The present invention relates to a connecting structure for opening and closing the connecting portions of sheets by slide fasteners. More particularly, the invention relates to a sheet-connecting structure for sheets to be opened or closed by slide fasteners, which can be applied for example to an opening and closing portion of a hood for a truck bed or a tent used for camping or mountain-climbing or to a connecting portion of a sheet for forming an agricultural tunnel or a portion for connecting sheets to each other at a building site or the like.

2. Brief Description of the Prior Art

A slide fastener is disposed on both sides of an opening of a sheet or the like to open or close the opening of the sheet or the like.

When this slide fastener is used in a place where any substantial tensile force acting in the lateral direction is not imposed, opening or closing of the fastener can be performed very smoothly, but when a strong tensile force acts in the lateral direction, the sliding movement of the fastener becomes subject to a great resistance, which causes the slide fastener to be very hard to open or close.

For example, in the case where a slide fastener is attached to an opening and closing portion of a hood of a truck, if the hood is pulled up on the stretched state, it becomes difficult to open or close the fastener. On the other hand, if the hood is pulled up in a relaxed state, though opening and closing of the fastener becomes easy, the hood sheet is not tightly set and is therefore readily flapped by wind during driving, and it is likely that the slide fastener is subjected to an excessive force application to lose its function in a short period of time.

Thus, in spite of the fact that the opening or closing operation with use of a slide fastener itself does not involve a particular problem, there has been a difficulty involved in the application of a slide fastener to sheets which must always be kept tightly stretched.

OBJECTS OF THE INVENTION

A primary object of the present invention is to provide a sheet-connecting structure with which the operation of opening or closing a slide fastener can be performed very smoothly and the sheet can be maintained in either a stretched or relaxed state.

Another object of the present invention is to provide a sheet-connecting structure provided with an adaptor having a net structure along the side of the tape of the slide fastener stringer so that when a strong force is applied to a sheet or the like during closing of the slide fastener, transfer of the strong force to the fastener and resultant breakage of the fastener can be effectively prevented.

BRIEF SUMMARY OF THE INVENTION

The sheet-connecting structure of the present invention is characterized in that stringers of a slide fastener are attached to connecting edges of a sheet and a tightening device is mounted on the sheet substantially parallel to the fastener stringers, said tightening device preferably extending at least a length substantially equivalent to the length of the fastener stringers.

According to the present invention, when the slide fastener is opened or closed, the tightening device is relaxed to loosen the sheet or prevent a tension from being imposed on the stringers. Therefore, the slider of the slide fastener can be slidably moved lightly and smoothly and the slide fastener is not damaged by the movement of the slider. Further, when the slide fastener is closed, the sheet can be tightened and stretched by clamping the tightening device.

BRIEF DESCRIPTION OF THE DRAWINGS

The drawings illustrate embodiments of the present invention, in which.

DETAILED DESCRIPTION OF THE PREFERRED EMBODIMENTS

Figure 1:
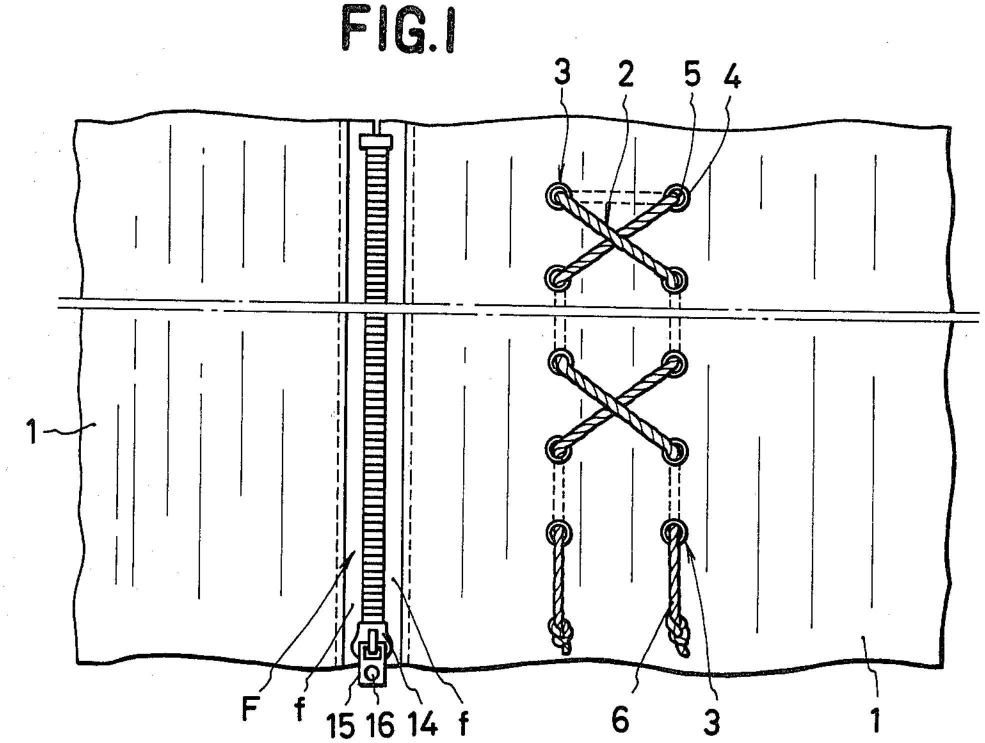
FIGS. 1 and 2 are front views showing the sheet-connecting structure of the present invention in the state where the tightening device is opened and in the state where the tightening device is clamped, respectively.

Referring to FIG. 1 illustrating the basic structure of the present invention, a sheet 1 is connected to another sheet 1, and left and right stringers f of a slide fastener F are sewn to the connecting edges (the opening and closing portion) of the sheets. When it is necessary to separate the left and right sheets 1 completely from each other, it may be devised to attach a slide fastener provided with an open-end part.

A slide fastener can be attached to a sheet according to various methods. For example, there can be mentioned a method in which stringers of the fastener are sewn to the sheet, a method in which stringers are bonded to the sheet by utilizing ultrasonic waves, and a method in which stringers are attached to the sheet by using and coating an adhesive.

The most characteristic feature of the present invention resides in that a tightening device 2 is attached to at least one of sheets to be connected, in the vicinity of the fastener stringer f along the lengthwise direction thereof. It is preferred that the tightening device 2 be disposed to extend at least along a length equal to the length of the fastener stringer f.

The tightening device 2 has functions of pulling up the intermediate portion of the sheet 1 in a direction intersecting the lengthwise direction of the slide fastener F at a right angle and maintaining and releasing this state.

Figure 2:
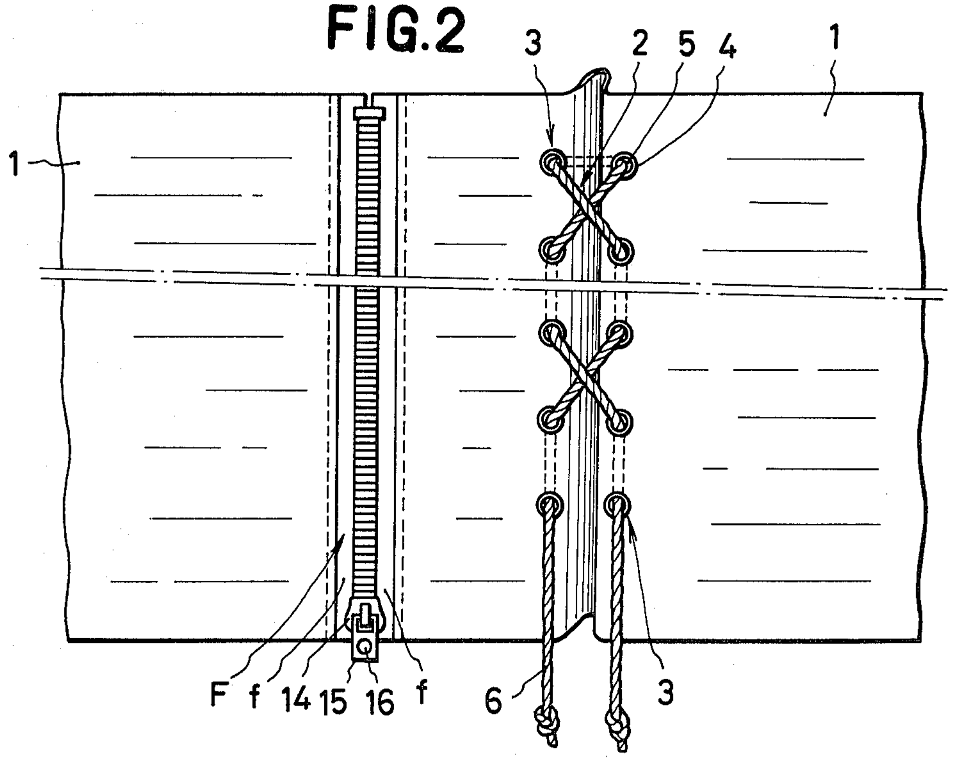

In the embodiment illustrated in FIGS. 1 and 2, string-engaging portions 3 individually comprising a hole 5 provided with a grummet 4 are arranged equidistantly in two rows on the sheet 1. One string 6 is passed through these holes 5 in the following manner.

The string 6 is first passed through two holes 5 in one row and it is then passed through the hole 5 of the other row which is located at a point higher by one stage and passed astride and through the parallel holes 5 of the uppermost stages of the respective rows. Both the ends of the string 6 are hung down from the holes 5 of the lowermost stage.

Figure 8:
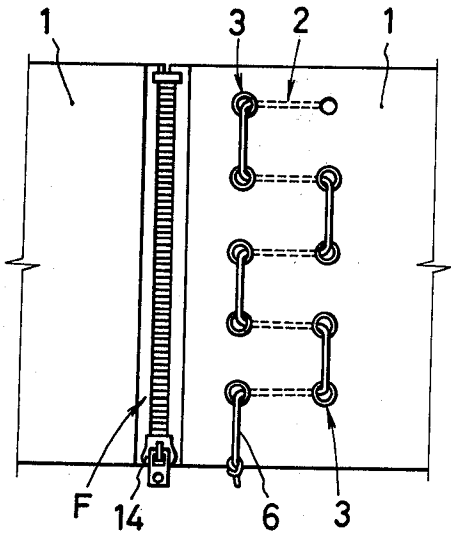
FIG. 8 is a front view showing a sheet to which a similar tightening device is attached.

In the tightening device of the present invention, the string 6 is generally hung in the above-mentioned manner, but the hanging method is not limited to the above-mentioned one. For example, as shown in FIG. 8, the top end of the string 6 may be fixed to the sheet and the string 6 may be hung zigzag while drawing a pattern of -shaped forms. More specifically, the string 6 is laced traversely through the string-engaging portions 3 of the same stage in the respective rows and is hung down stage by stage in the longitudinal direction.

Figure 9:
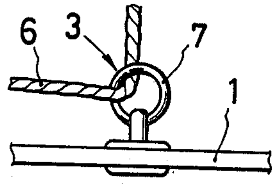
FIG. 9 is a side view illustrating a string-hanging portion of the tightening device.
Figure 10:
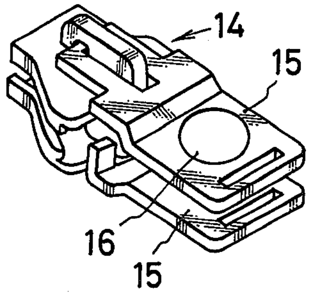
FIG. 10 is a perspective view showing one example of a slider to be used for a slide fastener.

As means for pulling up the sheet 1, there may be adopted an annular member rotatably fixed to the sheet 1 as shown in FIG. 9, through which the string 6 is passed. In the tightening device of this structure, since the annular member 7 is moved in such a direction that the string 6 can pass through the annular member 7 with ease, the operation of stretching or relaxing the string 6 can be facilitated, and further, since there is no open hole, intrusion of rain or the like can be effectively prevented and in addition, tear of the sheet 1 can be prevented.

When the sheet 1 is composed of a material that cannot easily be broken, stringers of the slide fastener can be directly attached to the sheet 1. However, when the sheet 1 is weak or it is desired to prevent occurrence of breakage at the stringers, it is preferred to use an adaptor 8.

Figure 3:
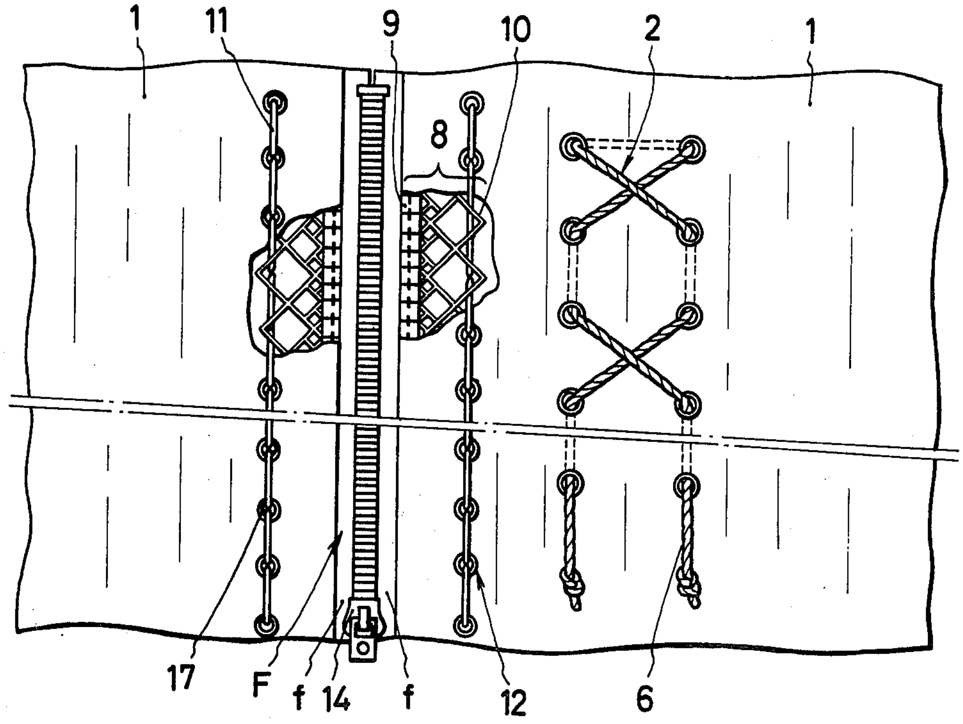
FIG. 3 is a front view showing an embodiment in which the slide fastener is attached to a sheet through an adaptor.
Figure 4:
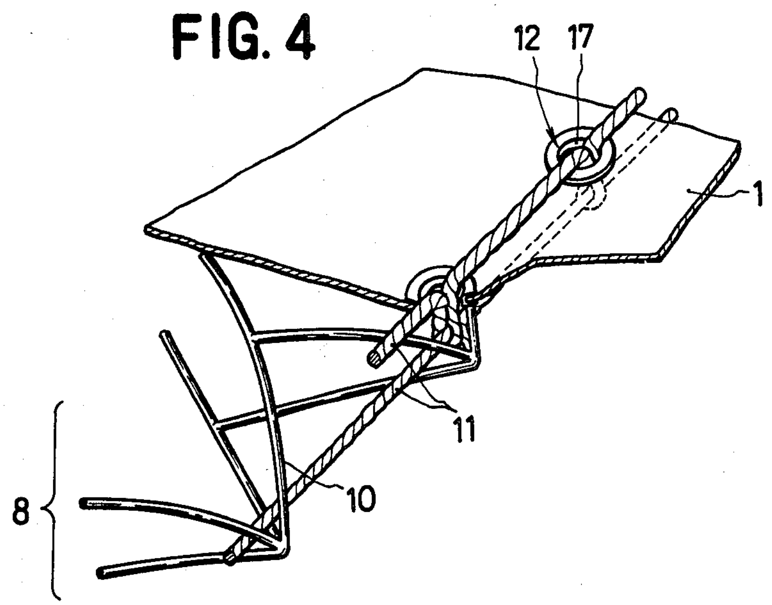
FIG. 4 is an enlarged perspective view showing the main part of the embodiment shown in FIG. 3.

An embodiment in which such adaptor is mounted is illustrated in FIGS. 3 and 4. Referring to FIGS. 3 and 4, a slide fastener F is attached to a sheet 1 through an adaptor 8. This adaptor 8 has a knitted band-like portion 9 on one side thereof and also has on the other side thereof a net portion 10 in which the mash size is gradually increased as it separates from the band-like portion 9. A stringer f of the slide fastener F is attached and fixed to the knitted band-like portion 9 by for example sewing, and the end of the net portion 10 of the adaptor 8 is fixed to a hanging member 12 by means of a string 11 or the like hung through an attachment hole 17 of the sheet 1.

Figure 5:
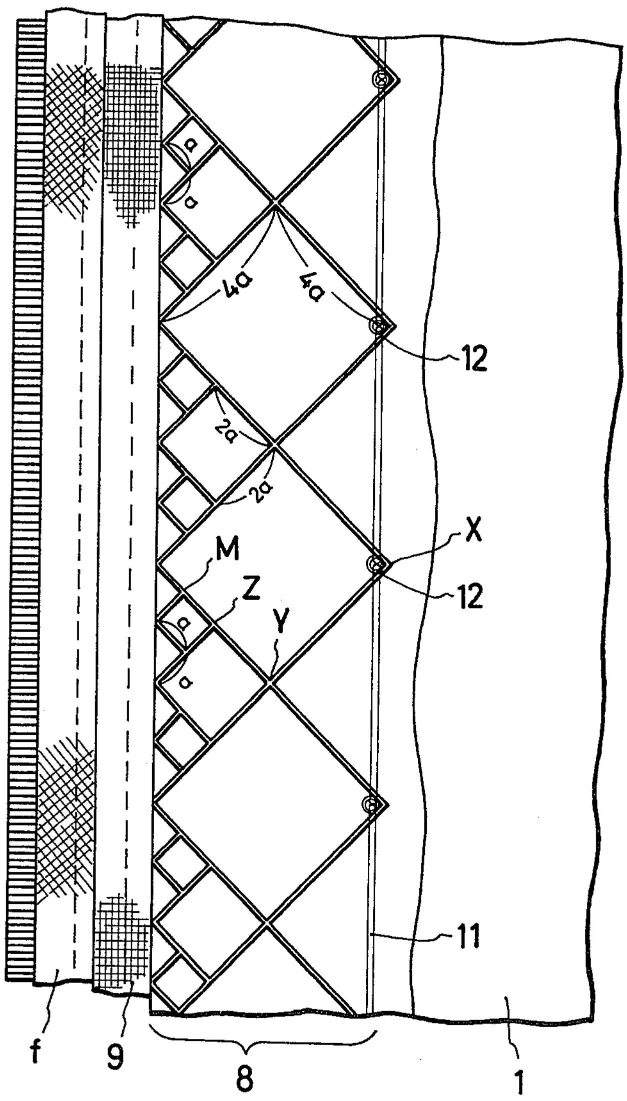
FIG. 5 is a top plan view, taken for an illustration of the dimensional details of the adaptor and the net structure in particular.
Figure 6:
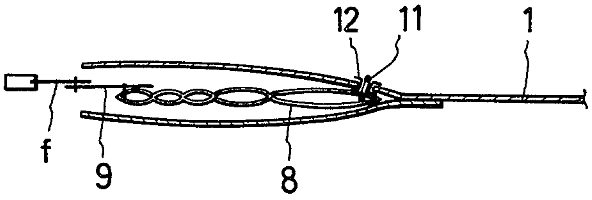
FIG. 6 is a cross-sectional view, showing the interconnection of the slide fastener and the adaptor.

As illustrated in FIGS. 5 and 6, the adaptor has a net-like structure having a smallest to a largest square meshes, of which the sizes are gradually greater in a geometrical progression such that when the length of the side of a smallest square mesh is a, that of a second smallest mesh is 2*a*, that of a third smallest mesh is 4*a* and so on. With the adaptor having such network, the force applied to the hanging member 12 fixed to sheet 1 is received at points X of the largest meshes, and it is successively gradually divided as by two (2) at the point Y of each second largest mesh, by four (4) at the point Z of each third largest mesh, by eight (8) at the point M of each fourth largest mesh, and so on, to be finally received by the band or belt-like portion 9. Thus, the force to sheet 1 applied at the points X is successively divided into portions through the adaptor 8 and virtually uniformly distributed about the belt-like portion 9, and it functions to pull the fastener stringer f in a lateral direction substantially evenly along its entire length, whereby concentration of tension application to any particular point and its accompanying breakage of the slide fastener can be effectively prevented.

The sheet-connecting structure of the present invention can be applied to all the uses where sheets must be connected in the tightened and stretched state, and the sheet-connecting structure of the invention can be applied especially effectively to a hood of a truck or other vehicles.

Figure 7:
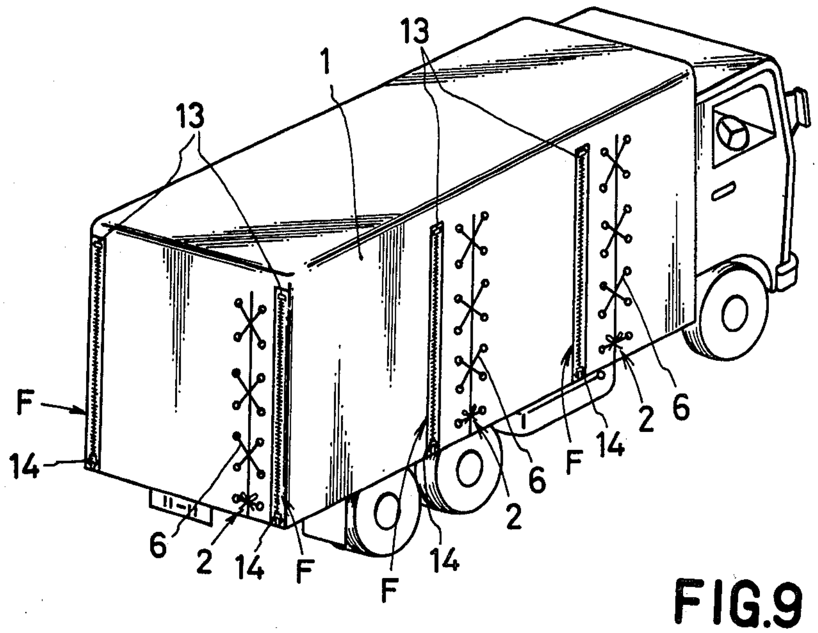
FIG. 7 is a perspective view showing an embodiment in which the sheet-connecting structure of the present invention is applied to a hood.

FIG. 7 illustrates an embodiment where the sheet-connecting structure of the present invention is applied to a hooded truck. More specifically, the structure of the present invention is applied to a hood-constituting sheet 1 having a closing and opening portion 13. A slide fastener F is attached to the closing and opening portion 13 and the above-mentioned tightening device 2 is attached to the intermediate portion of the sheet 1.

When there are formed a plurality of closing and opening portions 13 on the sheet 1, it is preferred that one tightening device 2 be disposed for every closing and opening portion 13 independently. Of course, provision of tightening devices 2 for some closing and opening portions 13 may be omitted. For example, it is possible to dispose one tightening device 2 for every two closing and opening portions 13.

A slider 14 of the slide fastener F, which is attached to each connecting edge of the sheet 1, may be a one provided with an ordinary type stopper means, and in accordance with the present invention it is possible to use a slider having a pull tab 15 on each face of the slider body or one of which upper and lower pull tabs 15 and 15 are mutually engageable to check slidable movement of the slider 14. Further, it may be able to adopt a modification in which rings are attached to both ends of the string 6 of the tightening device 2 so that the rings are hung on hooks mounted on a frame to which the sheet 1 is fixed or on hooks mounted on other parts.

In the sheet-connecting structure of the present invention, the above-mentioned tightening device for pulling up the sheet tightly along an opening or closing portion to which a slide fastener is attached is disposed.

This tightening device is operated in the following manner.

At first, the slide fastener F is interlocked to connect both sheets 1 and 1 to each other or close the opening and closing portion 13 of the sheet 1. Then, as shown in FIG. 2, both ends of the string 6 are pulled to contract the spaces between the corresponding string-engaging portions 3, 3, . . . of both rows, and both ends of the string 6 are tied together or they are fitted to suitable fixing parts to keep the sheet 1 in the tightened and stretched state.

When it is intended to open the slide fastener F, the string 6 is released from tension to expand the spaces between the corresponding string-engaging portions 3, 3, . . . of both rows, and the slider 14 is slid.

As will be apparent from the foregoing illustration, in the sheet-connecting structure of the present invention, by virtue of the feature that fastener stringers are attached to the connecting edges of a sheet and a tightening device is disposed in an intermediate portion of the sheet so that it can be tightened and relaxed in a direction intersecting said connecting edges at right angles, a slide fastener can be smoothly opened or closed by relaxing the sheet by this tightening device. Further, since the sheet can be kept in a tightened and full stretched state after connection of said connecting edges, flapping of the sheet by winds can be prevented completely and effectively. Accordingly, no abnormal tension is imposed on the slide fastener by flapping of the sheet and the slide fastener can be effectively prevented from being damaged. Therefore, the life of the slide fastener can be prolonged.

It is preferred that the tightening device for pulling up and tightening the sheet be disposed to extend substantially along the entire length of the slide fastener. In this embodiment, when the sheet is tightened, the pulling force to be imposed on the slide fastener is not concentrated locally at specific parts of the slide fastener but is imposed substantially uniformly in a divided manner along the entire length of the slide fasterner. Accordingly, in the closed state, the slide fastener can maintain the connection of the connecting edges of the sheet assuredly and stably.

When the slide fastener is attached through an adaptor 8 as shown in FIGS. 3, 5 and 6, the pulling force imposed on the adaptor is uniformly distributed to the entire band-like portion 9 by the presence of the net portion 10 and no stress is locally concentrated at specific parts of the slide fastener F. Accordingly, the connection can be maintained in a more stable state. Moreover, attachment of the slide fastener F to the sheet 1 is remarkably facilitated, and exchange of slide fasteners can be performed very easily even in case of long fasteners.

In the foregoing embodiments, there is illustrated a most preferred layout in which the tightening device 2 is disposed substantially along the entire length of the slide fastener F in the lengthwise direction thereof. In the present invention, there may be adopted other optional arrangements. More specifically, the tightening device 2 may be disposed so that tightening points, i.e., string-engaging portions 3, are arranged discontinuously along the slide fastener F in a dotted line or chain line, or a plurality or rows of tightening points of the tightening device 2 may be arranged so that the rows overlap one another here and there. In disposing such tightening device 2, it is important to satisfy the requirement that a force separating the two fastener stringers from each other is not imposed when the slide fastener is opened or shut. Any tightening device meeting this requirement, namely any tightening device capable of moderating such separating force or not causing such separating force on opening or closing of the slide fastener, can be effectively used in the present invention as well as the tightening device having the above-illustrated structure.

What is claimed is:

1. A sheet-connecting and stretching structure for use with a large loosely fitting cover or the like, comprising a slide fastener attached to connecting edges of a sheet and a tightening device disposed in an intermediate portion of the sheet and extending generally parallel to, but substantially spaced from said slide fastener, said tightening device being so constructed that the cover may be tightened following slide fastening or relaxed prior to slide unfastening in a direction intersecting said connecting edges of the sheet at right angles, wherein each of stringers of the slide fastener is attached to the sheet through an adaptor having on one side a band-like portion and on the other side a net portion in which the mesh size is gradually increased as the net portion separates from the band-like portion, and the net portion is releasably caught on and attached to a hanging member passing through the sheet, and wherein said sheet overlaps and covers said band-like portion and adapter.

* * * * *